UNITED STATES PATENT OFFICE.

JAMES HENRY MACKENZIE, OF SYDNEY, NEW SOUTH WALES, AUSTRALIA.

AIR-TIGHTLY SEALING COMPOSITION FOR METAL CONTAINERS, SPECIALLY THOSE FOR FOOD.

1,422,114.     Specification of Letters Patent.     Patented July 11, 1922.

No Drawing.     Application filed August 19, 1920. Serial No. 404,655.

*To all whom it may concern:*

Be it known that I, JAMES HENRY MACKENZIE, a subject of the King of Great Britain, residing at Veronica House, Trinity Avenue, Sydney, in the State of New South Wales and Commonwealth of Australia, have invented a new and useful Improvement in Air-Tightly Sealing Composition for Metal Containers, Specially Those for Food, of which the following is a specification.

This invention relates to a new and improved composition of matter for the sealing air-tightly of metal containers specially those for food substances and other perishable materials and thus dispensing with the use of solder for sealing the joints and the accompanying disadvantages in the applying of such solder.

This new and improved air-tightly sealing composition for metal containers consists of the admixture together in the manner and in and about the proportions stated of certain ingredients to produce a glutinous body which may be applied to the joint to be sealed in a machine for the purpose or by a brush or the like and which will quickly dry on and in said joint and which when dry will be durable and will prevent the passage of any air and or liquid through the joint.

This new and improved air-tightly sealing composition of matter is prepared by mixing together while in dry and finely powdered condition the materials named in the first column below in about the proportions by weight stated in ounces as set forth in the second column below though the best result under normal conditions is obtained by using proportions of about the mean of the stated limits as set out in the third column below.

| First column. | Second column. | Third column. |
|---|---|---|
| Flour | 6 to 12 | 8 |
| Bole armen | 4 to 8 | 6 |
| Gum tragacanth | 1 to 4 | 2 |
| Gum acacia | 2 to 8 | 4 |

Cold water is added to this mixed and dry powder and mixed with same so as to increase the bulk up to say from 150 to 250 fluid ounces though 200 fluid ounces gives the better result.

Bole-armen is a natural earth, which may be obtained from wholesale chemists and it is used for coloring purposes and as medicine. It is a friable clay colored strongly red by oxide or iron and it consists of hydrous silicates of alumina or less often of a magnesium.

This prepared fluid in any suitable vessel is brought to the boil and thus becoming a paste of the required and necessary consistency by hydrometer of between five (5) and ten (10) degrees Baumé but is not yet in sealing condition. To the paste while still hot is added by weight in ounces:

| | Second column. | Third column. |
|---|---|---|
| Crude glycerine | 1 to 3 | |
| But preferably | | 2 | and finally after the glycerine has been mixed with the paste there is well but slowly stirred into the whole (still hot) a mixture composed of by weight in ounces

| | Second column. | Third column. |
|---|---|---|
| Rosin | 42 to 54 | 48 |
| Methylated spirits | 60 to 84 | 72 | and the former being dissolved in and by the latter a quantity say about one gallon of glutinous mass results which mass is the sealing composition of this invention and may be packed in suitable vending or other containers.

In use the sealing composition is applied in ordinary can sealing or applying machines or by covering or painting the joint to be sealed by a brush or the like and when dry such joint is perfectly air-tight.

It has been found that in manufacture of this sealing composition the best results are attained when the mixing is carried out in an apartment wherein a temperature of about eighty degrees (80°) Fahrenheit is maintained and further that temperature is the best in which the composition can be stored.

In regard to the ingredients mentioned it is to be noted that the methylated spirits is used for the purpose of dissolving the rosen whose function is to make the composition tenacious while yet sticky and really compacting the whole into one body.

The bole armen is for coloring the composition but any other coloring earth or powder might be used in its place.

The gums are used to promote stickiness but the tragacanth must not be in excess as then the result would have sticky and doughy quality above requirements. The acacia in the mass will tone down the stickiness of the other gum.

The crude glycerine is incorporated in the composition to act as an emulsifier and to build up the homogeneity of the whole.

What I claim as my invention, and desire to secure by Letters Patent is:—

1. A glutinous composition for sealing tins consisting of a pasty mass of flour, gums, and water, sufficient glycerine to emulsify the mass, sufficient rosin to render said mass tenacious and sufficient methylated spirit to dissolve said rosin.

2. A composition as claimed in claim 1 in which the gums consists of gum tragacanth and gum acacia.

3. A composition of matter including substantially eight parts flour, substantially six parts bole-armen, substantially two parts gum tragacanth, substantially four parts gum acacia, water, substantially two parts glycerine, rosin and methylated spirit.

4. A glutinous composition for sealing tins consisting of substantially eight parts of flour, substantially six parts of gums, and water to form a pasty mass, a sufficient quantity of glycerine to emulsify said mass, sufficient rosin to render the mixture of flour, gums, water and glycerine tenacious, and a sufficient quantity of methylated spirit to dissolve said rosin.

In testimony whereof I have signed my name to this specification in the presence of two subscribing witnesses.

JAMES HENRY MACKENZIE.

Witnesses:
PERCY NEWELL,
I. HAMILTON.